US011210846B2

(12) United States Patent
Matsunobu et al.

(10) Patent No.: US 11,210,846 B2
(45) Date of Patent: Dec. 28, 2021

(54) THREE-DIMENSIONAL MODEL PROCESSING METHOD AND THREE-DIMENSIONAL MODEL PROCESSING APPARATUS

(71) Applicant: Panasonic Intellectual Property Management Co., Ltd., Osaka (JP)

(72) Inventors: Toru Matsunobu, Osaka (JP); Toshiyasu Sugio, Osaka (JP); Satoshi Yoshikawa, Hyogo (JP); Tatsuya Koyama, Kyoto (JP); Masaki Fukuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/066,935

(22) Filed: Oct. 9, 2020

(65) Prior Publication Data

US 2021/0027529 A1 Jan. 28, 2021

Related U.S. Application Data

(63) Continuation of application No. PCT/JP2019/015789, filed on Apr. 11, 2019.

(30) Foreign Application Priority Data

May 2, 2018 (JP) .............................. JP2018-088510

(51) Int. Cl.
*G06T 17/00* (2006.01)
*G06T 15/20* (2011.01)
*H04N 5/247* (2006.01)

(52) U.S. Cl.
CPC ............ *G06T 17/00* (2013.01); *G06T 15/205* (2013.01); *H04N 5/247* (2013.01)

(58) Field of Classification Search
None
See application file for complete search history.

(56) References Cited

U.S. PATENT DOCUMENTS

2011/0090337 A1* 4/2011 Klomp ................. G01C 11/025
348/144
2015/0172637 A1* 6/2015 Yoon ....................... G06T 7/149
348/46

(Continued)

FOREIGN PATENT DOCUMENTS

JP 2010-250452 11/2010

OTHER PUBLICATIONS

International Search Report dated Jul. 16, 2019 in International (PCT) Application No. PCT/JP2019/015789.

*Primary Examiner* — Frank S Chen
(74) *Attorney, Agent, or Firm* — Wenderoth, Lind & Ponack, L.L.P.

(57) ABSTRACT

A three-dimensional model processing method includes: generating, from first images shot by respective cameras at a first time, a first three-dimensional model including: first three-dimensional points indicating a subject at the first time; and first camera parameters indicating positions and orientations of the cameras; generating, from second images shot by the respective cameras at a second time, a second three-dimensional model including: second three-dimensional points indicating the subject at the second time; and second camera parameters indicating positions and orientations of the cameras; detecting a stationary camera among the cameras, whose position and orientation has not changed between the first and second times, or stationary three-dimensional points among the three-dimensional points, whose positions have not changed between the first and second times; and matching world coordinate systems of the first and second three-dimensional models, based on the first (Continued)

camera parameters of the stationary camera or the stationary three-dimensional points detected.

12 Claims, 15 Drawing Sheets

(56) References Cited

U.S. PATENT DOCUMENTS

| | | | | |
|---|---|---|---|---|
| 2018/0098073 A1* | 4/2018 | Lawrence | ............ | H04N 19/597 |
| 2018/0336737 A1* | 11/2018 | Varady | ...................... | G06T 7/62 |
| 2018/0367709 A1* | 12/2018 | Takama | ................ | H04N 5/2224 |
| 2019/0114472 A1* | 4/2019 | Hodge | ................... | H04N 7/181 |

* cited by examiner

THREE-DIMENSIONAL MODEL PROCESSING METHOD AND THREE-DIMENSIONAL MODEL PROCESSING APPARATUS

CROSS REFERENCE TO RELATED APPLICATIONS

This application is a U.S. continuation application of PCT International Patent Application Number PCT/JP2019/015789 filed on Apr. 11, 2019, claiming the benefit of priority of Japanese Patent Application Number 2018-088510 filed on May 2, 2018, the entire contents of which are hereby incorporated by reference.

BACKGROUND

1. Technical Field

The present disclosure relates to a three-dimensional model processing method and a three-dimensional model processing apparatus for reconstructing a three-dimensional model from a multi-viewpoint image.

2. Description of the Related Art

In the three-dimensional reconstruction technology in the field of computer vision, a plurality of two-dimensional images are associated with one another so that the positions and orientations of cameras, and the three-dimensional position of a subject are estimated. Further, camera calibration and three-dimensional point reconstruction are performed. For example, such three-dimensional reconstruction technology is used in a next-generation wide area monitoring system, or a free-viewpoint video generation system.

The apparatus described in Japanese Unexamined Patent Application Publication No. 2010-250452 performs calibration among three or more cameras, and converts each camera coordinate system into a virtual camera coordinate system of arbitrary viewpoint based on acquired camera parameters. The apparatus performs association between images after coordinate conversion by block matching in the virtual camera coordinate system, to estimate distance information. The apparatus synthesizes an image of virtual camera viewpoint based on the estimated distance information.

SUMMARY

A processing method for a three-dimensional model, according to one aspect of the present disclosure includes: generating a first three-dimensional model from first images shot by respective cameras at a first time, the first three-dimensional model including: first three-dimensional points indicating a subject at the first time; and first camera parameters indicating positions and orientations of the cameras; generating a second three-dimensional model from second images shot by the respective cameras at a second time different from the first time, the second three-dimensional model including: second three-dimensional points indicating the subject at the second time; and second camera parameters indicating positions and orientations of the cameras; detecting (1) one or more stationary cameras among the cameras, positions and orientations of the one or more stationary cameras not having changed between the first time and the second time, or (2) one or more stationary three-dimensional points among the plurality of three-dimensional points, positions of the one or more stationary three-dimensional points not having changed between the first time and the second time; and matching a first world coordinate system of the first three-dimensional model and a second world coordinate system of the second three-dimensional model, based on the first camera parameters of the one or more stationary cameras or the one or more stationary three-dimensional points detected.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
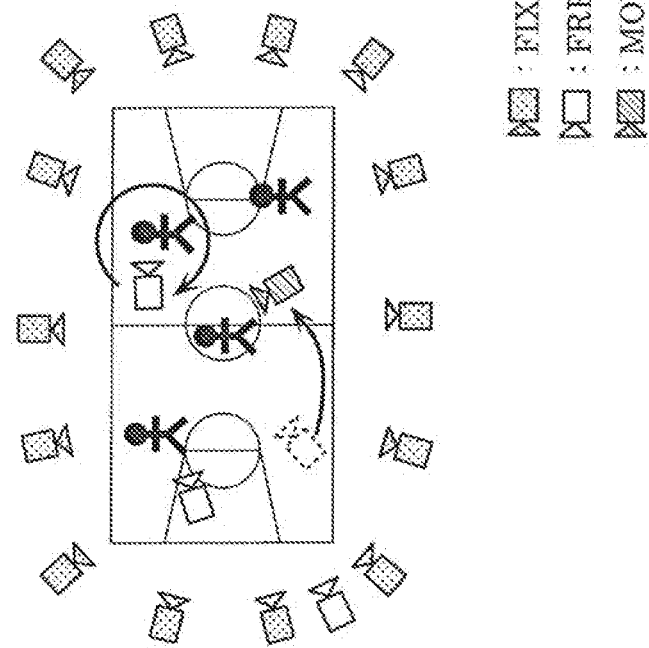
FIG. 1 is a diagram to show an outline of a free-viewpoint video generation system according to an embodiment.

Underlying Knowledge Forming Basis of Present Disclosure

When a three-dimensional model is reconstructed in time series by using multi-viewpoint images synchronously shot in time series, if calibration and estimation of distance information are performed independently at each time by the method according to Japanese Unexamined Patent Application Publication No. 2010-250452, the coordinate axes of three-dimensional model are different at each time so that changes of three-dimensional information in a time direction cannot be utilized. Specifically, when the position or orientation of camera is different or a subject moves between times, the coordinate axes of three-dimensional model may also differ at each time. As a result of this, for example, even when a virtual camera viewpoint is fixed, a free-viewpoint video in which the entire scene is continuously blurred may be generated.

Accordingly, in the present disclosure, a three-dimensional reconstruction method (also referred to as a three-dimensional model processing method or a processing method for a three-dimensional model) or a three-dimensional reconstruction apparatus (also referred to as a three-dimensional model processing apparatus), which can improve the accuracy of positional relationship of a three-dimensional model at each time, will be described.

A three-dimensional reconstruction method according to one aspect of the present disclosure includes: reconstructing a first three-dimensional model from a first multi-viewpoint image shot by a plurality of cameras at a first time, and reconstructing a second three-dimensional model from a second multi-viewpoint image shot by the plurality of cameras at a second time different from the first time, the first three-dimensional model including a plurality of first three-dimensional points indicating a subject and a plurality of first camera parameters indicating positions and orientations of the plurality of cameras, the second three-dimensional model including a plurality of second three-dimensional points indicating the subject and a plurality of second camera parameters indicating positions and orientations of the plurality of cameras; detecting (1) one or more stationary cameras whose positions and orientations have not changed between the first time and the second time, among the plurality of cameras, or (2) one or more stationary three-dimensional points whose positions have not changed between the first time and the second time, among the plurality of three-dimensional points; and matching a world coordinate system of the first three-dimensional model and a world coordinate system of the second three-dimensional model, using the one or more stationary cameras or the one or more stationary three-dimensional points detected.

Accordingly, since the three-dimensional reconstruction method can improve the accuracy of positional relationship of three-dimensional model at each time, it is possible to improve the accuracy of three-dimensional model.

For example, in the detecting, a global vector for a pair of images consisting of an image included in the first multi-viewpoint image and an image included in the second multi-viewpoint image may be calculated, the pair of images being shot by a same camera among the plurality of cameras; and whether the position and the orientation of the camera that shot the pair of images have changed between the first time and the second time may be detected using the global vector calculated.

For example, in the detecting: a motion vector of the subject in a pair of images consisting of an image included in the first multi-viewpoint image and an image included in the second multi-viewpoint image may be calculated, the pair of images being shot by a same camera among the plurality of cameras; and whether a position of a three-dimensional point corresponding to the subject has changed between the first time and the second time may be determined using the motion vector detected.

For example, in the detecting, whether the position and the orientation of each of the plurality of cameras has changed may be determined based on a result of sensing by an acceleration sensor included in each of the plurality of cameras.

For example, in the matching, two points may be selected from the one or more stationary three-dimensional points and three-dimensional positions of the one or more stationary cameras; and a deviation in scale between the first three-dimensional model and the second three-dimensional model may be corrected based on a distance between the two points selected, in each of the first three-dimensional model and the second three-dimensional model.

For example, in the matching, one stationary camera may be selected from the one or more stationary cameras; and a deviation in rotation or translation between the first three-dimensional model and the second three-dimensional model may be corrected based on a three-dimensional position and an orientation of the one stationary camera selected, in each of the first three-dimensional model and the second three-dimensional model.

For example, in the matching, at least one of a rotation, a translation, or a scale of the first three-dimensional model or the second three-dimensional model may be corrected to maintain relative relationships between the plurality of three-dimensional points and the positions of the plurality of cameras in the first three-dimensional model and relative relationships between the plurality of three-dimensional points and the positions of the plurality of cameras in the second three-dimensional model, and to reduce error between positions of the one or more stationary three-dimensional points and positions of the one or more stationary cameras in the first three-dimensional model and the second three-dimensional model.

For example, in the matching, a coordinate matching scheme may be selected based on a third reliability which is based on at least one of (i) the first camera parameters of the one or more stationary cameras and a first reliability of the one or more three-dimensional points included in the first three-dimensional model or (ii) the second camera parameters of the one or more stationary cameras and a second reliability of the three-dimensional points included in the second three-dimensional model, and the world coordinate system of the first three-dimensional model and the world coordinate system of the second three-dimensional model may be matched by using the coordinate matching scheme selected.

Accordingly, the three-dimensional reconstruction method can use an appropriate coordinate matching scheme in accordance with reliability.

For example, the first reliability may utilize, as an index, a reprojection error obtained when the one or more three-dimensional points included in the first three-dimensional model are projected onto an image plane of the one or more stationary cameras included in the first three-dimensional model, using the first camera parameters of the one or more stationary cameras, and the second reliability may utilize, as an index, a reprojection error obtained when the one or more three-dimensional points included in the second three-dimensional model are projected onto an image plane of the one or more stationary cameras included in the second three-dimensional model, using the second camera parameters of the one or more stationary cameras.

For example, in the matching: when the third reliability is higher than a reference value, a first coordinate matching scheme which matches the world coordinate system of the first three-dimensional model and the world coordinate system of the second three-dimensional model may be selected based on an error between (i) part of the first camera parameters of the one or more stationary cameras and the one or more stationary three-dimensional points included in the first three-dimensional model and (ii) part of the second camera parameters of the one or more stationary cameras and the one or more stationary three-dimensional points included in the second three-dimensional model; and when the third reliability is lower than the reference value, a second coordinate matching scheme which matches the world coordinate system of the first three-dimensional model and the world coordinate system of the second three-dimensional model may be selected based on an error between (i) all of the first camera parameters of the one or more stationary cameras and the one or more stationary three-dimensional points included in the first three-dimensional model and (ii) all of the second camera parameters of the one or more stationary cameras and the one or more stationary three-dimensional points included in the second three-dimensional model.

Accordingly, the three-dimensional reconstruction method can use an appropriate coordinate matching scheme in accordance with reliability.

A three-dimensional reconstruction apparatus according to one aspect of the present disclosure includes: a reconstruction circuit configured to reconstruct a first three-dimensional model from a first multi-viewpoint image shot by a plurality of cameras at a first time, and reconstruct a second three-dimensional model from a second multi-viewpoint image shot by the plurality of cameras at a second time different from the first time, the first three-dimensional model including a plurality of first three-dimensional points indicating a subject and a plurality of first camera parameters indicating positions and orientations of the plurality of cameras, the second three-dimensional model including a plurality of second three-dimensional points indicating the subject and a plurality of second camera parameters indicating positions and orientations of the plurality of cameras; a detector configured to detect (1) one or more stationary cameras whose positions and orientations have not changed between the first time and the second time, among the plurality of cameras, or (2) one or more stationary three-dimensional points whose positions have not changed between the first time and the second time, among the plurality of three-dimensional points; and a coordinate matching circuit configured to match a world coordinate system of the first three-dimensional model and a world coordinate system of the second three-dimensional model, using the one or more stationary cameras or the one or more stationary three-dimensional points detected.

Accordingly, since the three-dimensional reconstruction method can improve the accuracy of positional relation of three-dimensional models at each time, the three-dimensional reconstruction method can improve the accuracy of the three-dimensional model. Furthermore, the three-dimensional reconstruction method performs coordinate matching using a stationary camera and a stationary three-dimensional point. Accordingly, the accuracy of coordinate matching can be improved.

Note that these generic or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The following describes embodiments with reference to the drawings. Note that the following embodiments show exemplary embodiments of the present disclosure. The numerical values, shapes, materials, structural components, the arrangement and connection of the structural components, steps, the processing order of the steps, etc. shown in the following embodiments are mere examples, and thus are not intended to limit the present disclosure. Of the structural components described in the following embodiments, structural components not recited in any one of the independent claims that indicate the broadest concepts will be described as optional structural components.

Embodiment

The three-dimensional reconstruction apparatus (three-dimensional model processing apparatus) according to an embodiment of the present disclosure can reconstruct time-series three-dimensional models whose coordinate axes are consistent between times. Specifically, first, three-dimensional reconstruction apparatus 200 acquires a three-dimensional model at each time by performing three-dimensional reconstruction independently at each time. Next, the three-dimensional reconstruction apparatus detects a stationary camera and a stationary object (stationary three-dimensional points) and performs coordinate matching of three-dimensional models between times using the detected stationary camera and stationary object, thereby generating time-series three-dimensional models whose coordinate axes are consistent between times.

This allows the three-dimensional reconstruction apparatus to generate a time-series three-dimensional model in which relative positional relationship between the subject and the camera at each time is highly accurate regardless of fixed/non-fixed state of the camera or moving/stationary state of the subject, and which can utilize information that changes in a time direction.

FIG. 1 is a diagram to show an outline of a free-viewpoint video generation system. For example, a space to be shot can be three-dimensionally reconstructed (three-dimensional space reconstruction) by shooting the same space from multi-viewpoints by using a calibrated camera (for example, fixed camera). By performing tracking, scene analysis, and video rendering using these three-dimensionally reconstructed data, a video seen from arbitrary viewpoint (free-viewpoint camera) can be generated. This allows realization of a next-generation wide-area monitoring system, and a free-viewpoint video generation system.

Figure 2:
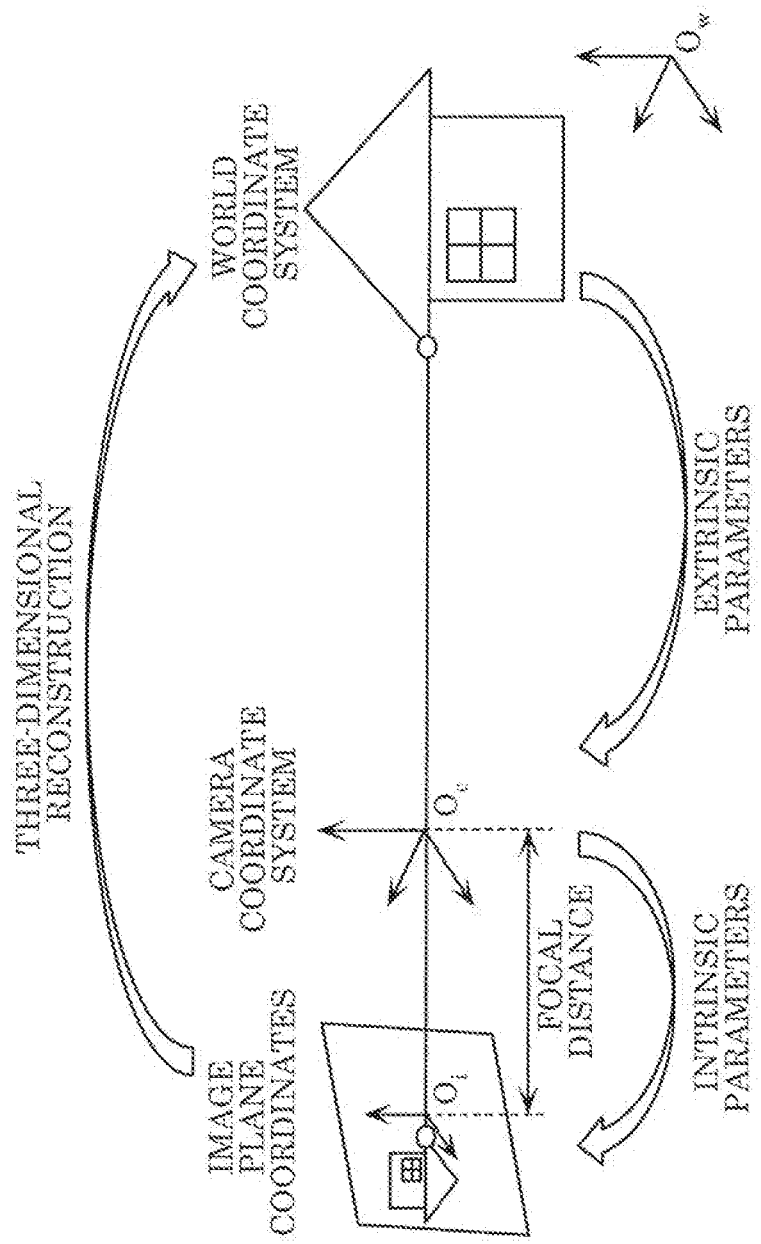
FIG. 2 is a diagram to illustrate a three-dimensional reconstruction processing according to an embodiment.

A three-dimensional reconstruction in the present disclosure will be defined. A video or an image which is obtained by shooting a subject present in a real space by a plurality of cameras at different viewpoints is called as a multi-viewpoint video or a multi-viewpoint image. That is, a multi-viewpoint image includes a plurality of two-dimensional images obtained by shooting a same subject from different viewpoints. Moreover, multi-viewpoint images shot in time-series are called as a multi-viewpoint video. Reconstructing a subject in a three-dimensional space by using the multi-viewpoint image is called as three-dimensional reconstruction. FIG. 2 is a diagram to show a mechanism of three-dimensional reconstruction.

The three-dimensional reconstruction apparatus reconstructs points in an image plane in a world coordinate system by using camera parameters. A subject reconstructed in a three-dimensional space is called as a three-dimensional model. A three-dimensional model of a subject indicates three-dimensional positions of each of a plurality of points on the subject depicted on two-dimensional images of multi-viewpoints. A three-dimensional position is represented, for example, by three-value information consisting of an X component, Y component, and Z component of a three-dimensional coordinate space defined by X, Y, and Z axes. Note that the three-dimensional model may include not only three-dimensional positions, but also information indicating the color of each point or a surface feature of each point and its surrounding.

In this situation, the three-dimensional reconstruction apparatus may acquire camera parameters of each camera in advance, or estimate them at the same time as creation of a three-dimensional model. The camera parameters include intrinsic parameters including a focal distance, an image center, and the like of camera, and extrinsic parameters indicating three-dimensional position and orientation of camera.

FIG. 2 shows an example of typical pin-hole camera model. This model does not take lens distortion of camera into consideration. When taking lens distortion into consideration, the three-dimensional reconstruction apparatus uses a corrected position obtained by normalizing the position of a point in the image plane coordinate by a distortion model.

Figure 3:
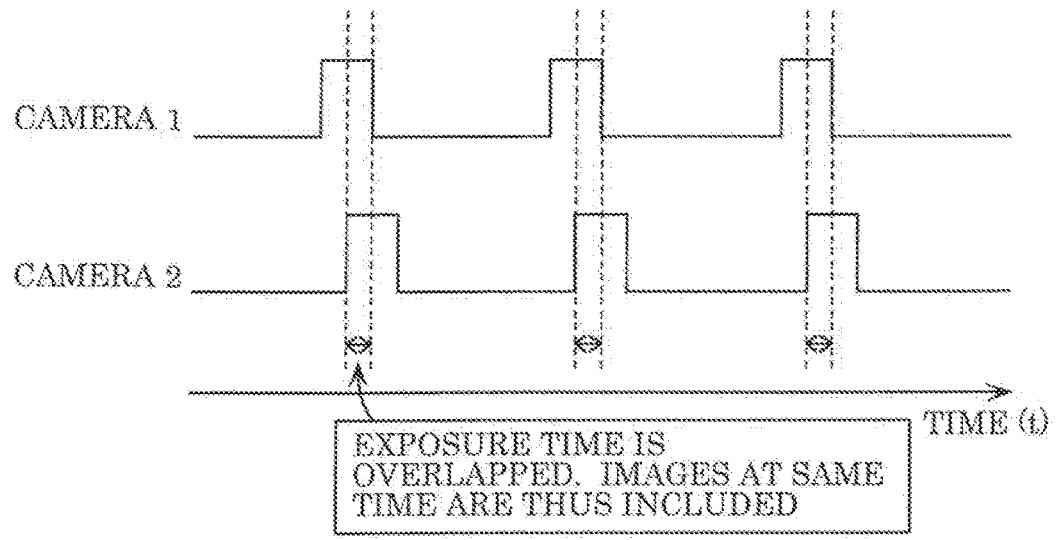
FIG. 3 is a diagram to illustrate synchronous shooting according to an embodiment.
Figure 4:
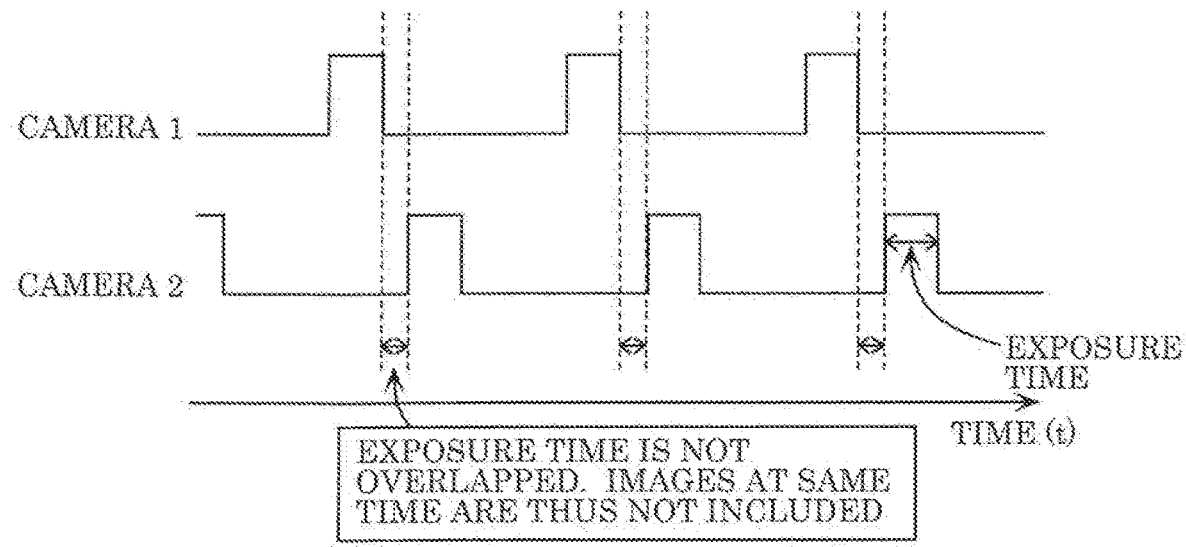
FIG. 4 is a diagram to illustrate synchronous shooting according to an embodiment.

Next, synchronous shooting of multi-viewpoint video will be described. FIGS. 3 and 4 are diagrams to illustrate synchronous shooting. Lateral directions of FIGS. 3 and 4 indicate time, and a time during which a rectangular signal appears indicates that the camera is being exposed to light. When acquiring an image by the camera, a time during which the shutter is opened is called as an exposure time.

During an exposure time, a scene which is exposed to an imaging element through a lens is obtained as an image. In FIG. 3, exposure times are overlapped in frames which are shot by two cameras with different viewpoints. For that reason, frames acquired by two cameras are discriminated to be synchronous frames which include a scene of the same time.

On the other hand, in FIG. 4, since there is no overlap of exposure time in two cameras, frames acquired by the two cameras are discriminated to be asynchronous frames which include no scene of the same time. Shooting synchronous frames by a plurality of cameras as shown in FIG. 3 is called as synchronous shooting.

Figure 5:
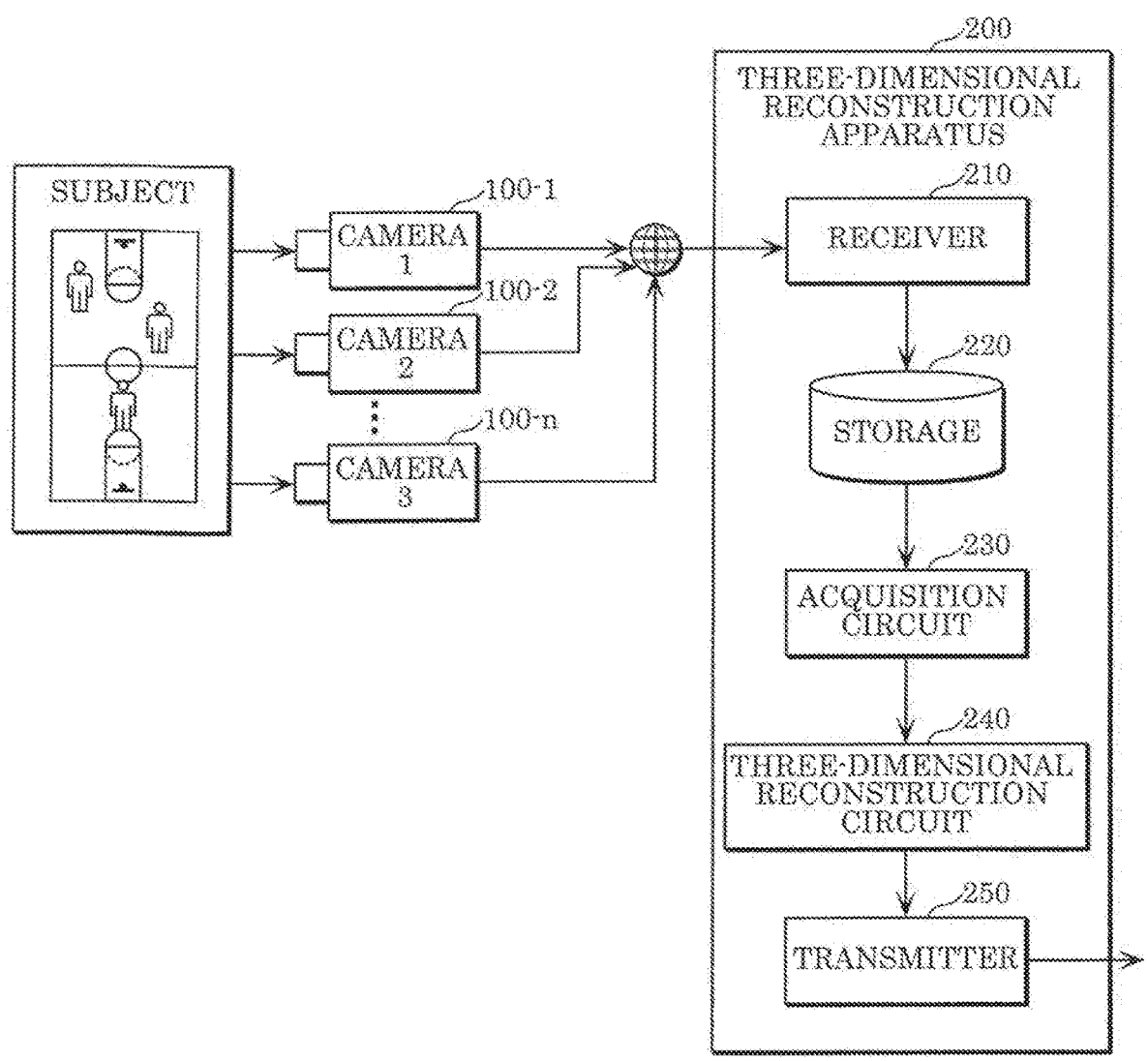
FIG. 5 is a block diagram of a three-dimensional reconstruction system according to an embodiment.

Next, the configuration of a three-dimensional reconstruction system according to an embodiment of the present disclosure will be described. FIG. 5 is a block diagram of a three-dimensional reconstruction system according to an embodiment of the present disclosure. The three-dimensional reconstruction system shown in FIG. 5 includes a plurality of cameras 100-1 to 100-$n$, and three-dimensional reconstruction apparatus 200.

The plurality of cameras 100-1 to 100-$n$ shoot a subject, and output a multi-viewpoint video which includes a plurality of shot videos. The transmission of the multi-viewpoint video may be performed via either of a public communication network such as the Internet, or a dedicated communication network. Alternatively, the multi-viewpoint video may be once stored in an external storage device such as a hard disk drive (HDD) or a solid state drive (SSD) etc. and is inputted into three-dimensional reconstruction apparatus 200 as needed. Alternatively, multi-viewpoint video is once transmitted to and stored in an external storage device such as a cloud server via a network. Then, the multi-viewpoint video may be transmitted to three-dimensional reconstruction apparatus 200 as needed.

Moreover, each of the plurality of cameras 100-1 to 100-$n$ may be a fixed camera such as a monitor camera; a mobile camera such as a video camera, a smart phone, or a wearable camera; or a moving camera such as a drone with a shooting function.

Moreover, camera-specific information such as a camera ID to identify the camera used for shooting may be added to the multi-viewpoint video as header information of video or frame.

Synchronous shooting to shoot a subject at a same time may be performed in each frame by using the plurality of cameras 100-1 to 100-$n$. Alternatively, time of the clocks contained in the plurality of cameras 100-1 to 100-$n$ are adjusted, and shooting time information may be added, or an index number to indicate shooting order may be added to each video or frame without performing synchronous shooting.

Information to indicate whether synchronous shooting is performed or asynchronous shooting is performed may be added as header information to each video set, each video, or each frame of multi-viewpoint video.

Moreover, three-dimensional reconstruction apparatus 200 includes receiver 210, storage 220, acquisition circuit 230, three-dimensional reconstruction circuit 240, and transmitter 250.

Figure 6:
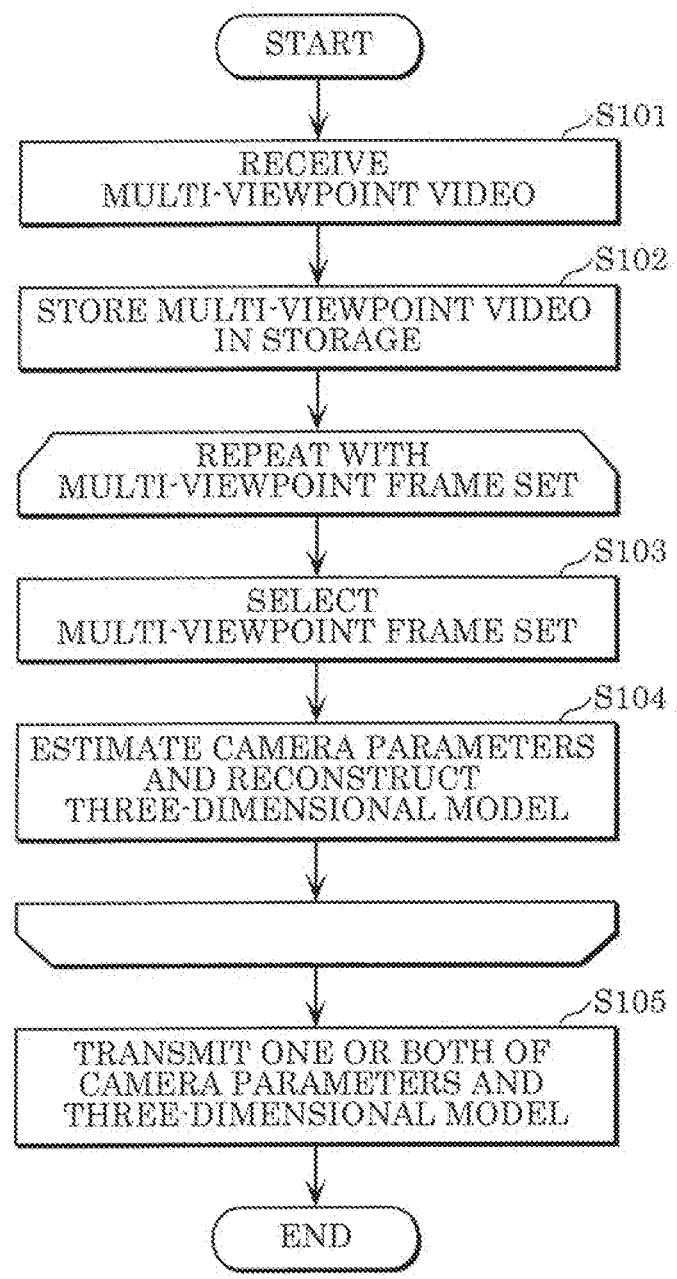
FIG. 6 is a flowchart to show processing by a three-dimensional reconstruction apparatus according to an embodiment.

Next, operation of three-dimensional reconstruction apparatus 200 will be described. FIG. 6 is a flowchart to show the operation of three-dimensional reconstruction apparatus 200 according to an embodiment of the present disclosure.

First, receiver 210 receives a multi-viewpoint video shot by a plurality of cameras 100-1 to 100-$n$ (S101). Storage 220 stores the received multi-viewpoint video (S102).

Next, acquisition circuit 230 selects frames from multi-viewpoint video and outputs them to three-dimensional reconstruction circuit 240 as a multi-viewpoint frame set (S103).

For example, the multi-viewpoint frame set may be constituted by a plurality of frames: in which one frame is selected from each of videos of all viewpoints; in which at least one frame is selected from each of videos of all viewpoints; in which one frame is selected from each of videos of two or more viewpoints selected from multi-viewpoint video; or in which at least one frame is selected from each of videos of two or more viewpoints selected from multi-viewpoint video.

Moreover, when camera-specific information is not added to each frame of the multi-viewpoint frame set, acquisition circuit 230 may add camera-specific information separately to the header information of each frame, or all together to the header information of the multi-viewpoint frame set.

Further, when an index number indicating shooting time or shooting order is not added to each frame of the multi-viewpoint frame set, acquisition circuit 230 may add the shooting time or index number separately to the header information of each frame, or all together to the header information of the multi-viewpoint frame set.

Next, three-dimensional reconstruction circuit 240 estimates camera parameters of each camera by using the multi-viewpoint frame set, and reconstructs a three-dimensional model of a subject depicted in each frame (S104).

Moreover, the processing of steps S103 and S104 are repeatedly performed for each multi-viewpoint frame set.

Finally, transmitter 250 transmits one or both of the camera parameters and the three-dimensional model of a subject to the outside (S105).

Figure 7:
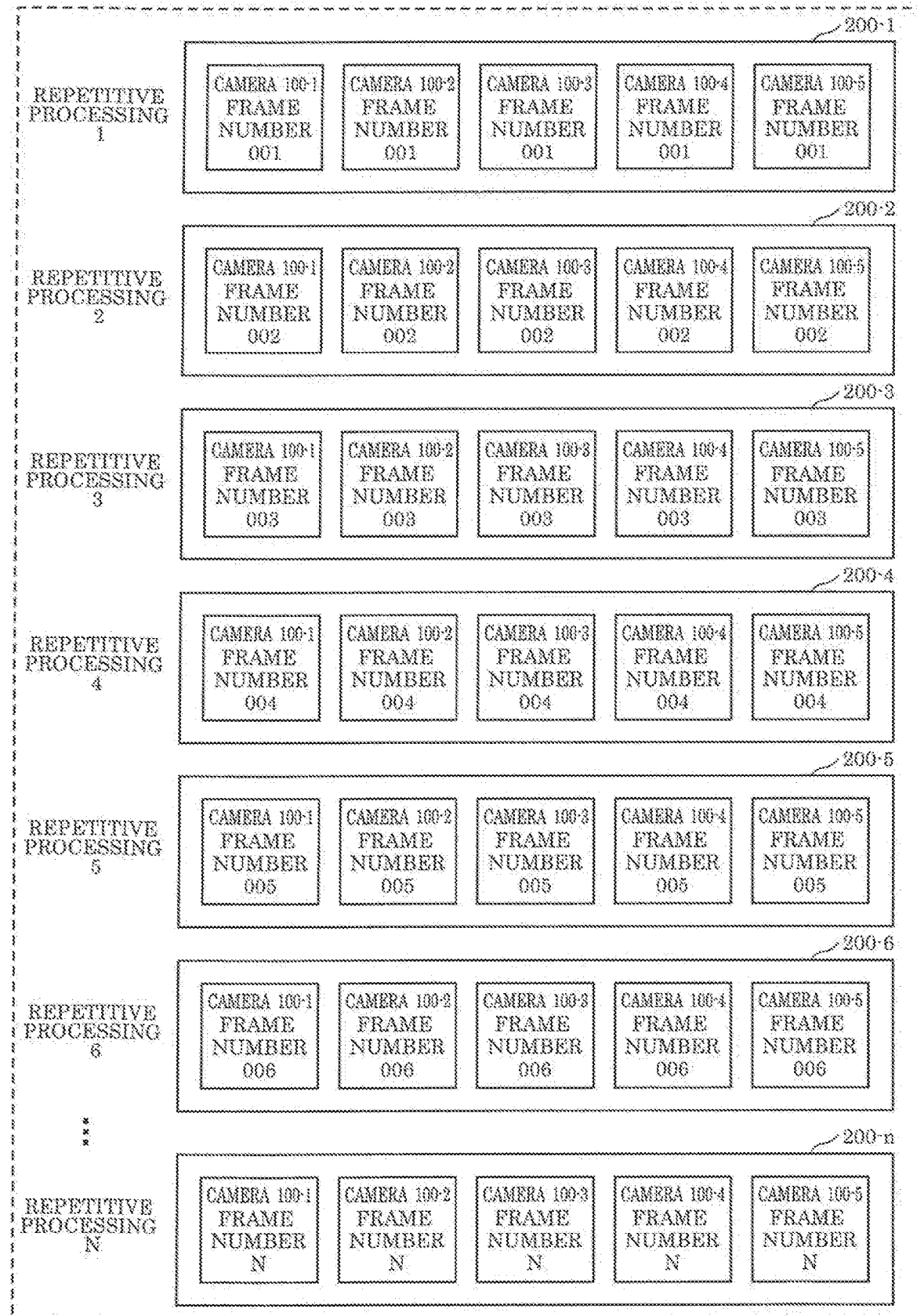
FIG. 7 is a diagram to show an example of a multi-viewpoint frame set according to an embodiment.

Next, the multi-viewpoint frame set will be described in detail. FIG. 7 is a diagram to show an example of a multi-viewpoint frame set. Here, an example in which the multi-viewpoint frame set is determined by acquisition circuit 230 selecting one frame from each of 5 cameras 100-1 to 100-5 will be described.

Moreover, it is supposed that synchronous shooting is performed by a plurality of cameras. Camera IDs to identify the camera with which shooting is performed are given as 100-1 to 100-5 respectively to the header information of each frame. Moreover, frame numbers 001 to N indicating shooting order in each camera are given to the header information of each frame indicating that a subject at a same time is shot in frames having the same frame number between cameras.

Acquisition circuit 230 successively outputs multi-viewpoint frame sets 200-1 to 200-n to three-dimensional reconstruction circuit 240. Three-dimensional reconstruction circuit 240 successively performs three-dimensional reconstruction by repetitive processing using multi-viewpoint frame sets 200-1 to 200-n.

Multi-viewpoint frame set 200-1 is constituted by 5 frames of frame number 001 of camera 100-1, frame number 001 of camera 100-2, frame number 001 of camera 100-3, frame number 001 of camera 100-4, and frame number 001 of camera 100-5. Three-dimensional reconstruction circuit 240 reconstructs a three-dimensional model at a time when frame number 001 is shot by using multi-viewpoint frame set 200-1 as a first set of frames of multi-viewpoint video in repetitive processing 1.

Frame numbers are updated in all the cameras in multi-viewpoint frame set 200-2. Multi-viewpoint frame set 200-2 is constituted by 5 frames of frame number 002 of camera 100-1, frame number 002 of camera 100-2, frame number 002 of camera 100-3, frame number 002 of camera 100-4, and frame number 002 of camera 100-5. Three-dimensional reconstruction circuit 240 reconstructs a three-dimensional model at a time when frame number 002 is shot by using multi-viewpoint frame set 200-2 in repetitive processing 2.

Hereinafter, after repetitive processing 3 as well, frame numbers are updated in all the cameras. This allows three-dimensional reconstruction circuit 240 to reconstruct a three-dimensional model of each time.

However, since three-dimensional reconstruction is performed independently at each time, the coordinate axes and scales of the reconstructed plurality of three-dimensional models do not necessarily coincide with each other. That is, to acquire a three-dimensional model of a moving subject, it is necessary to match the coordinate axes and scales at each time.

In that case, each frame is given a shooting time and, based on the shooting time, acquisition circuit 230 creates a multi-viewpoint frame set by combining synchronous frames with asynchronous frames. Hereinafter, a discrimination method of a synchronous frame and an asynchronous frame by using the shooting time between two cameras will be described.

Let a shooting time of a frame selected from camera 100-1 be T1, a shooting time of a frame selected from camera 100-2 be T2, an exposure time of camera 100-1 be TE1, and an exposure time of camera 100-2 be TE2. Shooting times T1, T2 each refer to a time at which exposure is started in examples of FIGS. 3 and 4, that is, a time at which a rectangular signal rises up.

In this case, the exposure end time of camera 100-1 is T1+TE1. Here, if (Equation 1) or (Equation 2) holds, two cameras are considered to be shooting a subject of a same time, and it is discriminated that two frames are synchronous frames.

$$T1 \leq T2 \leq T1+TE1 \quad \text{(Equation 1)}$$

$$T1 \leq T2+TE2 \leq T1+TE1 \quad \text{(Equation 2)}$$

Figure 8:
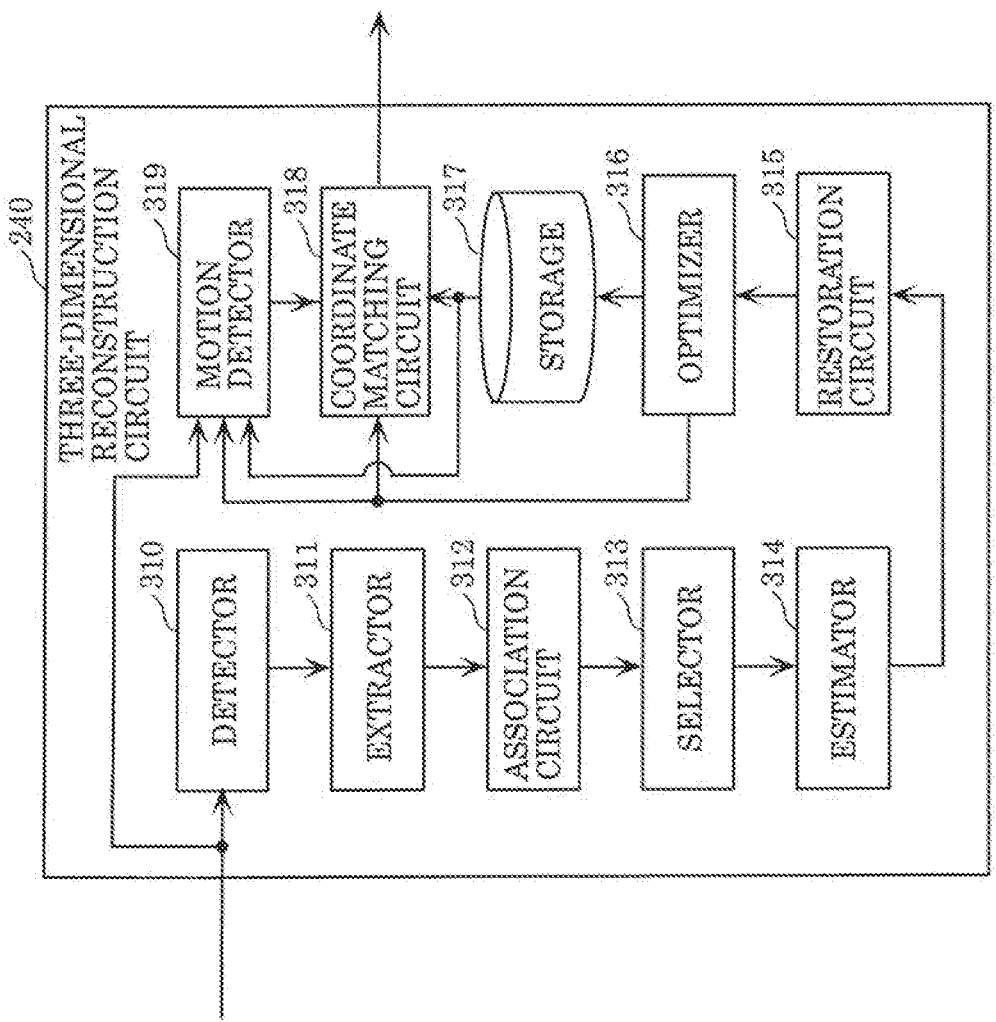
FIG. 8 is a block diagram of a three-dimensional reconstruction circuit according to an embodiment.

Next, three-dimensional reconstruction circuit 240 will be described in detail. FIG. 8 is a block diagram to show a structure of three-dimensional reconstruction circuit 240. As shown in FIG. 8, three-dimensional reconstruction circuit 240 includes detector 310, extractor 311, association circuit 312, selector 313, estimator 314, restoration circuit 315, optimizer 316, storage 317, coordinate matching circuit 318, and motion detector 19.

Figure 9:
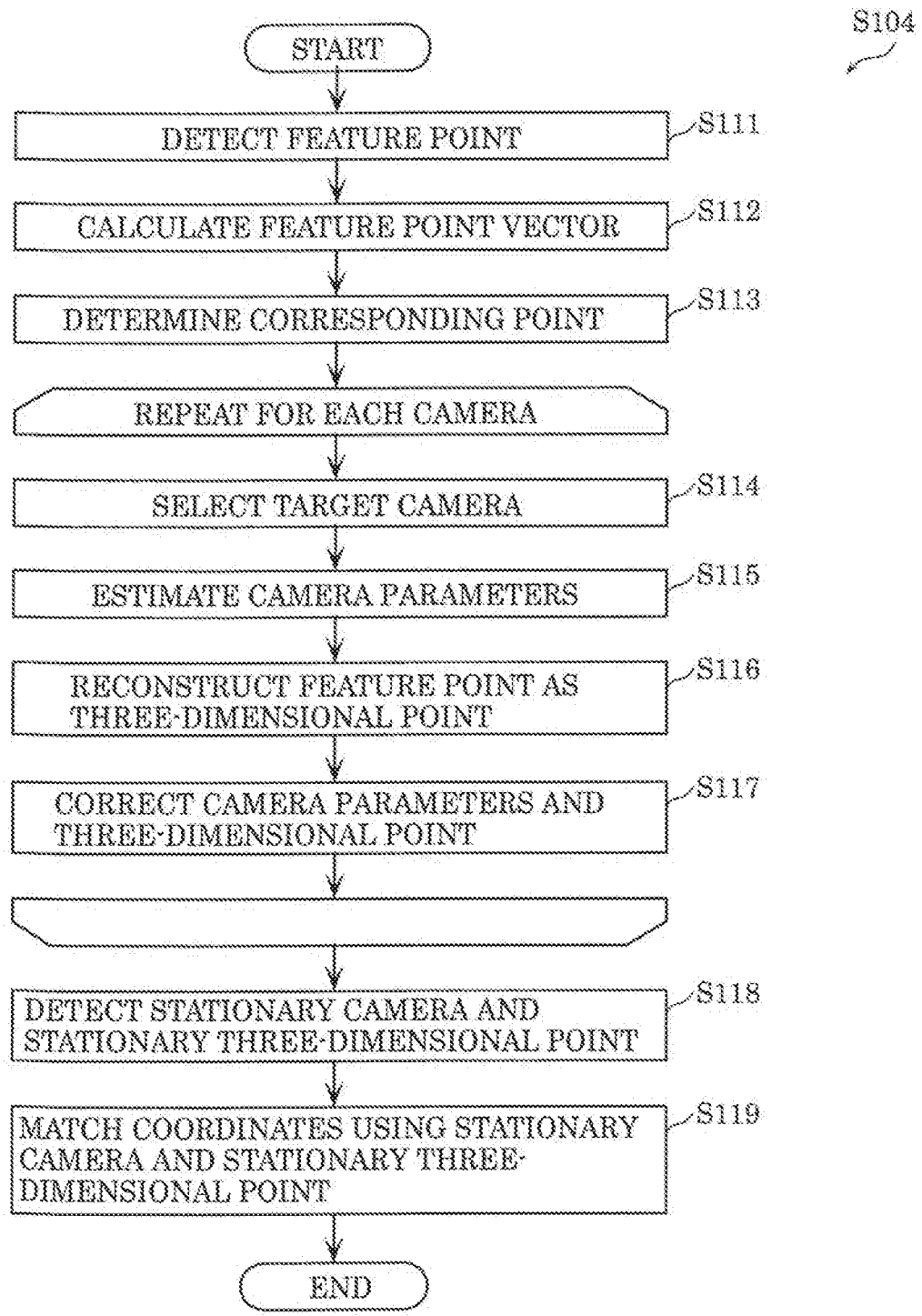
FIG. 9 is a flowchart to show processing by the three-dimensional reconstruction circuit according to an embodiment.

FIG. 9 is a flowchart to illustrate the operation of three-dimensional reconstruction circuit 240. Note that the processing shown in FIG. 9 is performed, for example, for each multi-viewpoint frame set.

First, detector 310 detects feature points of all the frames included in a multi-viewpoint frame set (S111). A feature point refers to a point, an edge, or a certain region such as a contour of an object included in a frame, a corner of an object or space, or an intersecting point of objects in a frame plane, or a point, a side, or a certain region, whose luminance or coloration is significantly different from its surroundings.

Next, extractor 311 calculates a feature vector of all the feature points detected in detector 310 (S112). A feature vector is a vector representation of distribution in the gradient direction of luminance or color of pixels included in a specific region including feature points. Note that the feature point and feature vector may be another image information. For example, the feature point and feature vector may be those that are detected by using texture information or information after frequency transformation.

Next, association circuit 312 determines a corresponding point of a pair of frames using the feature vector extracted by extractor 311 (S113). For example, association circuit 312 searches a feature point of another frame, which has a feature vector similar to the feature vector of a feature point included in a certain frame, and determines these two feature points as a corresponding point. That is, the corresponding point indicates two feature points indicating a same three-dimensional point included in different frames. Moreover, association circuit 312 determines a plurality of corresponding points by performing the same processing on each feature point of each frame.

Next, selector 313 selects a target camera, which is a target of three-dimensional reconstruction, from non-estimated cameras using the corresponding points determined by association circuit 312 or a three-dimensional point calculated by optimizer 316 to be described below (S114). A non-estimated camera refers to a camera among a plurality of cameras, which is not subjected to estimation processing of camera parameters to be described below. Note that the processing from step S114 to step S117 is repetitively performed for each camera, and when all the cameras have been subjected to the processing, the process proceeds to step S118.

Next, estimator 314 estimates camera parameters of the target camera by using corresponding points determined by association circuit 312 (S115).

Next, restoration circuit 315 reconstructs a feature point in a frame as a three-dimensional point by using camera parameters estimated by estimator 314 (S116). Specifically, restoration circuit 315 reconstructs a three-dimensional model of a subject by reverse-projecting each feature point in a frame, which has been shot by the target camera, on three-dimensional coordinates.

Next, optimizer 316 corrects the camera parameters estimated by estimator 314 and a plurality of three-dimensional points restored by restoration circuit 315 such that the entire three-dimensional model is optimized, and stores the corrected three-dimensional model in storage 317 (S117). Furthermore, storage 317 stores the multi-viewpoint frame set.

As a result of the processing of steps S114 to S117 being performed on all the cameras, a three-dimensional model based on a multi-viewpoint frame set at a certain time is generated.

Next, motion detector 319 detects a stationary camera whose position and orientation have not changed among the cameras that shot the multi-viewpoint frame set, and stationary three-dimensional points whose positions have not changed among the three-dimensional points included in the three-dimensional model (S118).

Next, coordinate matching circuit 318 performs coordinate matching processing to match coordinates of the obtained three-dimensional model with the coordinates of a reconstructed three-dimensional model at another time, using the stationary camera and the stationary three-dimensional points (S119).

It should be noted that although motion detector 319 detects both the stationary camera and the stationary three-dimensional points in the foregoing description, motion detector 319 may detect either one. Then, coordinate matching circuit 318 may perform the coordinate matching processing using the detected stationary camera or stationary three-dimensional points.

In this manner, three-dimensional reconstruction apparatus 200 reconstructs a first three-dimensional model from a first multi-viewpoint image shot by a plurality of cameras at a first time, and reconstructs a second three-dimensional model from a second multi-viewpoint image shot by the plurality of cameras at a second time different from the first time, the first three-dimensional model including a plurality of first three-dimensional points indicating a subject and a plurality of first camera parameters indicating positions and orientations of the plurality of cameras, the second three-dimensional model including a plurality of second three-dimensional points indicating the subject and a plurality of second camera parameters indicating positions and orientations of the plurality of cameras. Next, three-dimensional reconstruction apparatus 200 detects (1) one or more stationary cameras whose positions and orientations have not changed between the first time and the second time, among the plurality of cameras, or (2) one or more stationary three-dimensional points whose positions have not changed between the first time and the second time, among the plurality of three-dimensional points. Next, three-dimensional reconstruction apparatus 200 matches a world coordinate system of the first three-dimensional model and a world coordinate system of the second three-dimensional model, using the one or more stationary cameras or the one or more stationary three-dimensional points detected. Since this allows three-dimensional reconstruction apparatus 200 to improve the accuracy of positional relationship of three-dimensional models at each time, three-dimensional reconstruction apparatus 200 can improve the accuracy of the three-dimensional models.

Hereinafter, examples of an estimation method of camera parameters using a corresponding point (S115) and reconstruction method of a three-dimensional model (S116) will be described. Three-dimensional reconstruction circuit 240 calculates coordinates and orientation of camera in a world coordinate system with epipolar geometry as a constraint condition, and further calculates a three-dimensional position in a world coordinate system of a point on the image which has been shot by the camera.

Figure 10:
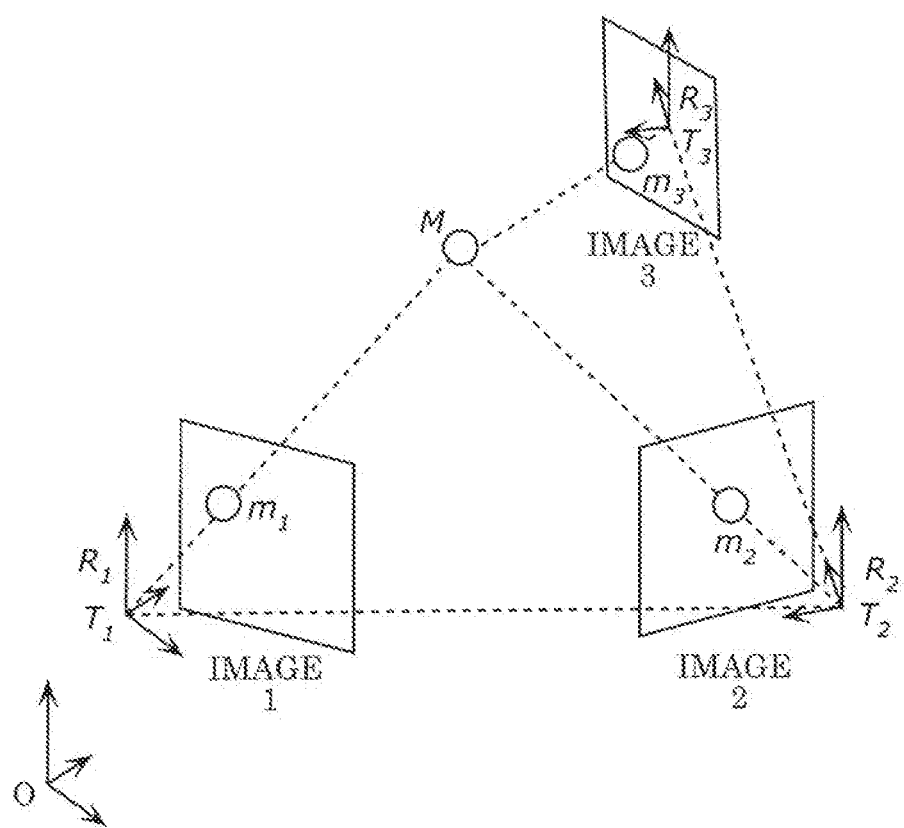
FIG. 10 is a diagram to illustrate a method for estimating camera parameters, and a method for reconstructing a three-dimensional model.

FIG. 10 is a diagram to illustrate a method for estimating camera parameters and a method for reconstructing a three-dimensional model. An example in which intrinsic parameters of camera are known, and extrinsic parameters of camera are estimated by using three frames (image 1, image 2, and image 3) to reconstruct a three-dimensional model of a subject is illustrated.

To acquire camera parameters of each camera, it is necessary to calculate rotation matrices $R_1$, $R_2$, $R_3$ and translation vectors $T_1$, $T_2$, $T_3$ of the camera in a world coordinate system with O as the origin. First, a method of calculating the rotation matrix and the translation vector of the camera that shot image 1 and image 2 will be described. When a point $m_1=(u_1, v_1, 1)$ on image 1 corresponds to a point $m_2$ on image 2, an epipolar equation which satisfies (Equation 3) holds for both.

[Math. 1]

$$m_1^T F m_2 = 0 \quad \text{(Equation 3)}$$

Here, F is called as Fundamental matrix (F matrix). Estimator 314 can acquire respective points as a point $m_1=(x_1, y_1, z_1)$ and $m_2=(x_2, y_2, z_2)$ of each camera coordinate system by a conversion equation shown in (Equation 4) using intrinsic parameters K of each camera. The epipolar equation can be rewritten as (Equation 5).

[Math. 2]

$$\tilde{m} = Km \quad \text{(Equation 4)}$$

[Math. 3]

$$\tilde{m}_1^T E \tilde{m}_2 = 0 \quad \text{(Equation 5)}$$

Here, E is called as Essential matrix (E matrix). Estimator 314 can calculate each element of E matrix by using a plurality of corresponding points. Moreover, estimator 314 may acquire E matrix by the conversion equation of (Equation 6) after calculating each element of F matrix by using a plurality of corresponding points such as points $m_1$ and $m_2$ between images.

$$E = K^{-1} F K \quad \text{(Equation 6)}$$

Estimator 314 can acquire a rotation matrix and a translation vector from image 1 to image 2 in the world coordinate system by decomposing this E matrix. When the position of camera 1 in the world coordinate system and the inclination of camera 1 with respect to each axis of the world coordinate system are known, estimator 314 can acquire positions and orientations of camera 1 and camera 2 in the world coordinate system by using a relative relation between camera 1 and camera 2. Estimator 314 may calculate the position and orientation of camera 1 in the world coordinate system by using camera information other than video (for example, information obtained by a sensor, such as a gyro sensor or an accelerometer, included in the camera), or may measure them in advance. Moreover, estimator 314 may calculate the position and orientation of another camera with the camera coordinate system of camera 1 as the world coordinate system.

Note that when lens distortion of camera is taken into consideration, estimator 314 corrects the position of a point on an image by using a distortion model, and acquires F matrix or E matrix by using the corrected position. Estimator 314 uses, as an example, a distortion model in the radial direction of lens as shown in (Equation 7).

$$u_{undistorted} = u(1 + k_1 r^2 + k_2 r^4 + k_3 r^6)$$

$$v_{undistorted} = v(1 + k_1 r^2 + k_2 r^4 + k_3 r^6)$$

$$r^2 = u^2 + v^2 \quad \text{(Equation 7)}$$

Moreover, restoration circuit 315 can acquire three-dimensional coordinates M of a corresponding point on the world coordinate system of the corresponding point by a triangle formed by using rotation matrices and translation vectors of image 1 and image 2.

Moreover, the above described geometrical relation can be extended to three-viewpoints. When image 3 is added to image 1 and image 2, estimator 314 calculates E matrices for image 2 and image 3, and for image 1 and image 3, respectively to acquire a relative rotation matrix and a translation vector between each camera. By integrating these, estimator 314 can calculate the rotation matrix and the translation vector in the world coordinate system of the camera of image 3.

Moreover, the rotation matrix and the translation vector of image 3 may be calculated from corresponding points in image 3 and image 1, and image 3 and image 2, respectively. Specifically, corresponding points are found between image 1 and image 2, and image 2 and image 3. When it is supposed that a point ma on image 3 corresponding to point $m_1$ on image 1 and point $m_2$ on image 2 is obtained, since the three-dimensional coordinates M of this corresponding point have been acquired, it is possible to acquire corresponding relation between a point on image 3 and coordinates in the three-dimensional space. In this situation, (Equation 8) holds.

[Math. 4]

$$\tilde{m} = Pm \qquad \text{(Equation 8)}$$

Here, P is referred to as Perspective matrix (P matrix). Since the relation of (Equation 9) holds for P matrix, E matrix, and intrinsic matrix, estimator 314 can acquire E matrix of image 3, and thereby find the rotation matrix and the translation vector.

$$P = KE \qquad \text{(Equation 9)}$$

Note that even when the intrinsic parameters are unknown, estimator 314 can find the intrinsic matrix and E matrix by calculating F matrix or P matrix, and thereafter dividing F matrix and P matrix under the restriction that the intrinsic matrix is an upper triangular matrix and E matrix is a positive definite symmetric matrix.

Figure 11:
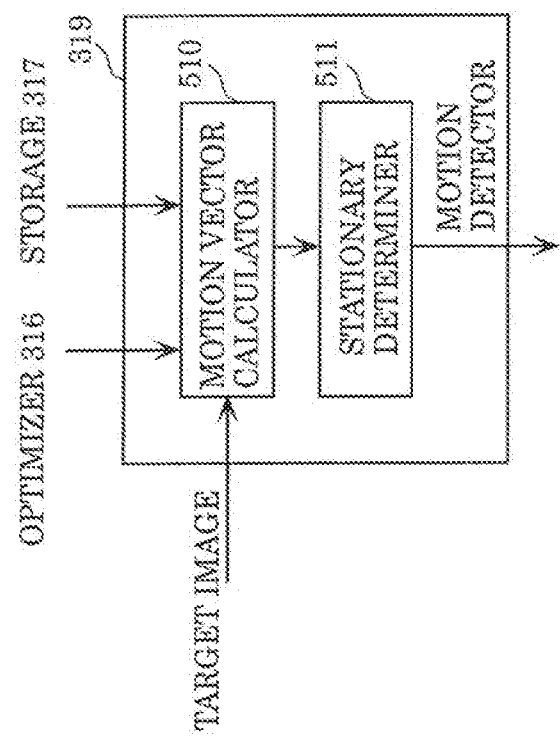
FIG. 11 is a block diagram of a coordinate matching unit according to an embodiment.
Figure 12:
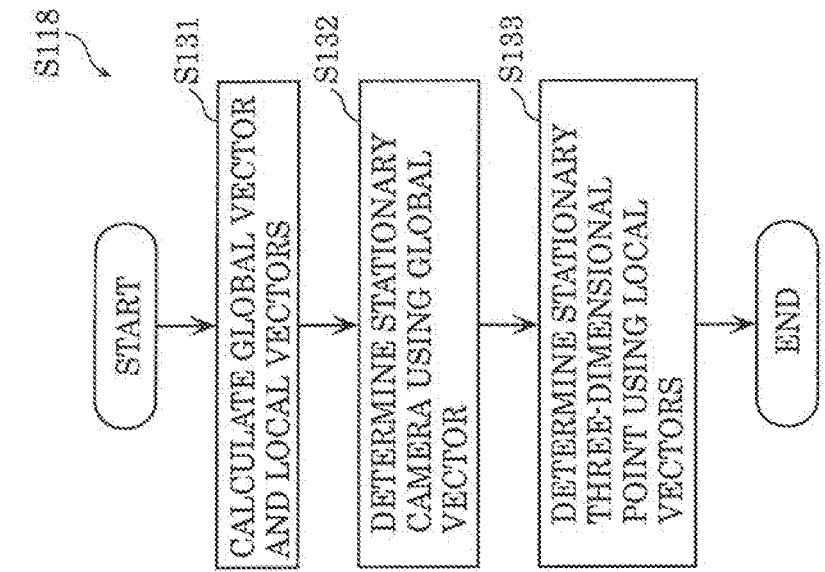
FIG. 12 is a flowchart to show the processing by the coordinate matching unit according to an embodiment.
Figure 14:
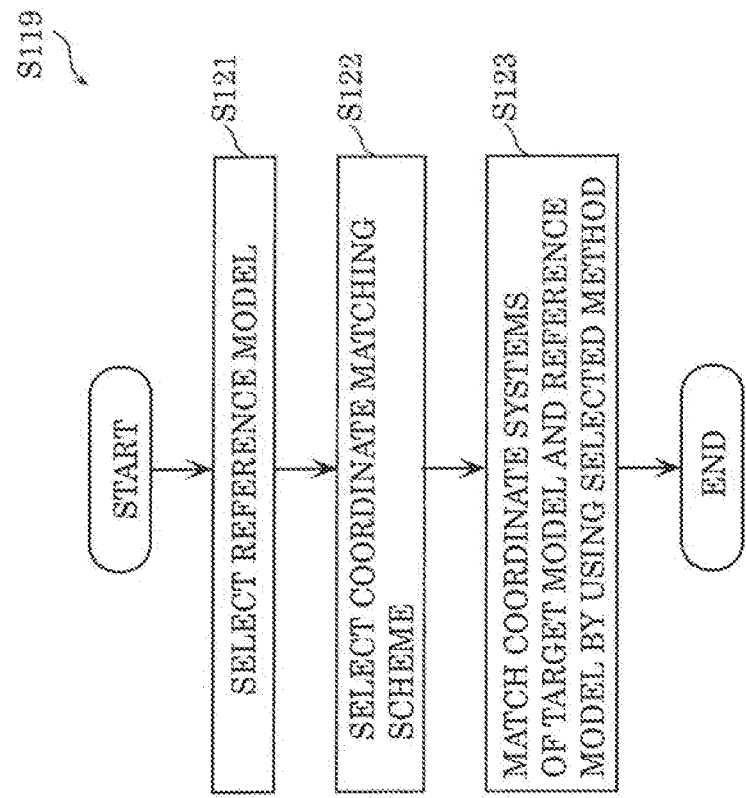
FIG. 14 is a flowchart to show the processing by the coordinate matching circuit according to an embodiment.

Hereinafter, the configuration of motion detector 319 and details of the stationary camera and stationary three-dimensional point detection process (S118) will be described. FIG. 11 is a block diagram illustrating the structure of motion detector 319. FIG. 14 is a flowchart of the stationary camera and stationary three-dimensional point detection process.

Motion detector 319 performs the process illustrated in FIG. 14 on each of the plurality of images included in a multi-viewpoint frame set at a processing target time. Furthermore, hereinafter, an image to be processed is referred to as a target image. Furthermore, an image shot before (for example, immediately before) the target image by the same camera that shot the target image, that is stored in storage 317 is referred to as a reference image. Motion detector 319 includes motion vector calculator 510 and stationary determiner 511.

First, motion vector calculator 510 calculates a global vector indicating motion for the entire target image and a local vector indicating motion per image region, using the target image, the reference image, and the camera parameters and three-dimensional model at the processing target time generated by optimizer 316 (S131).

Specifically, motion vector calculator 510 calculates global vectors using the method described below. Motion vector calculator 510 performs sampling at equal intervals or randomly on the plurality of image regions in the target image, and calculates the motion vectors of the respective image regions with respect to the reference image. Then, motion vector calculator 510 detects a global vector indicating the motion of the camera, by applying the calculated motion vectors to the motion model (pan, tilt, parallel movement, and so on) of the camera. Accordingly, a plurality of global vectors respectively indicating the motion of a plurality of cameras are detected.

Furthermore, motion vector calculator 510 calculates local vectors using the method below. First, motion vector calculator 510 generates a reprojected image by reprojecting the plurality of three-dimensional points included in the three-dimensional model obtained from optimizer 316 on an image plane of the target image. Motion vector calculator 510 calculates a local vector which is a motion vector corresponding to the reference image, for each of the plurality of two-dimensional points in the reprojected image corresponding to the plurality of three-dimensional points. Accordingly, a plurality of local vectors respectively indicating motion of a plurality of subjects (three-dimensional points) are detected.

It should be noted that motion vector calculator 510 may calculate local vectors based on a single reprojected image on a single image plane and a single reference image, or may calculate local vectors based on a plurality of reprojected images on a plurality of image planes and a plurality of reference images.

For example, motion vector calculator 510 generates a first reprojected image by reprojecting a target three-dimensional point on a first image plane of a first camera, and motion vector calculator 510 calculates a first motion vector indicating motion of the target three-dimensional point using the generated first reprojected image and a first reference image shot by the first camera. In the same manner, motion vector calculator 510 generates a second reprojected image by reprojecting the target three-dimensional point on a second image plane of a second camera different from the first camera, and motion vector calculator 510 calculates a second motion vector indicating motion of the target three-dimensional point using the generated second reprojected image and the first reference image shot by the first camera. Then, motion vector calculator 510 determines that there is movement of the target three-dimensional point when at least one of the first motion vector or the second motion vector indicates movement of the target three-dimensional point. Moreover, motion vector calculator 510 determines that there is movement of the target three-dimensional point when both the first motion vector and the second motion vector indicate that there is movement of the target three-dimensional point. In this manner, the presence of motion can be more accurately detected by using motion seen from a plurality of directions.

It should be noted that the global vector and local vector calculation method is one example, and is not limited to the above-described method. For example, block matching and so on may be used.

Furthermore, in the method in the present embodiment, it is sufficient that the presence of motion of a camera and respective three-dimensional points can be detected, and thus detection of a motion vector (magnitude and direction of motion) is not necessarily required.

Next, stationary determiner 511 determines a stationary camera by using a global vector (S132). Specifically, stationary determiner 511 determines a camera whose motion indicated by the global vector is smaller than a predetermined threshold value to be a stationary camera.

Furthermore, stationary determiner 511 determines stationary three-dimensional points by using local vectors (S133). Specifically, stationary determiner 511 determines a three-dimensional point whose motion indicated by the local vector is smaller than a predetermined threshold value to be a stationary three-dimensional point.

Furthermore, stationary determiner 511 outputs, to coordinate matching circuit 318, information indicating the stationary camera and the stationary three-dimensional points. For example, stationary determiner 511 assigns, to the camera parameters, 1 bit data indicating whether a camera is a stationary camera, and assigns, to three-dimensional point data, 1 bit data indicating whether a three-dimensional point is a stationary three-dimensional point. It should be noted that stationary determiner 511 may exclude cameras and three-dimensional points other than the stationary camera and the stationary three-dimensional points from the three-dimensional model, and generate a three-dimensional model consisting of the stationary camera and the stationary three-dimensional points.

In this manner, three-dimensional reconstruction apparatus 200 calculates a global vector for a pair of images consisting of an image included in the first multi-viewpoint and an image included in the second multi-viewpoint image that were shot by the same camera. Three-dimensional reconstruction apparatus 200 determines whether the position and orientation of the camera that shot the pair of images has changed between a first time and a second time, using the calculated global vector.

Furthermore, three-dimensional reconstruction apparatus 200 calculates a motion vector (a local vector) of the subject in the pair of images included in the first multi-viewpoint and the second multi-viewpoint image and shot by the same camera, and determines whether the position of the three-dimensional point corresponding to the subject has changed between the first time and the second time, using the calculated motion vector.

It should be noted that motion of the camera may be detected using a method other than that described above. For example, three-dimensional reconstruction apparatus 200 may determine whether the position and orientation of each of a plurality of cameras based on a result of sensing by an acceleration sensor provided in each of the plurality of cameras.

Figure 13:
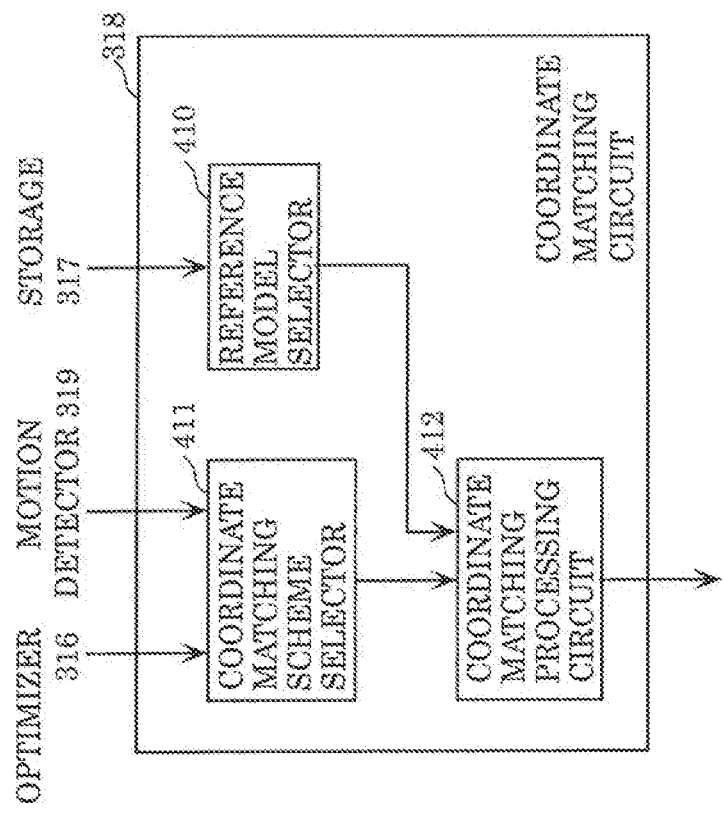
FIG. 13 is a block diagram of a coordinate matching circuit according to an embodiment.

Hereinafter, the configuration of coordinate matching circuit 318 and details of coordinate matching processing (S119) will be described. FIG. 13 is a block diagram to illustrate the structure of coordinate matching circuit 318. FIG. 14 is a flowchart of the coordinate matching processing.

Coordinate matching circuit 318 performs coordinate matching processing to match the coordinate system of a three-dimensional model at a current time with the coordinate system of a reconstructed three-dimensional model which is stored in storage 317. The former is called as a target model, and the latter as a reference model.

Coordinate matching circuit 318 includes reference model selector 410, coordinate matching scheme selector 411, and coordinate matching processing circuit 412.

First, reference model selector 410 selects a reference model from among reconstructed three-dimensional models which are stored in storage 317 to match the coordinate system of a target model outputted by optimizer 316 with the coordinate system of the reconstructed three-dimensional model (S121). Specifically, reference model selector 410 selects a high reliability model as a reference model. For example, reference model selector 410 selects a model with a low reprojection error as the reference model. The reprojection error is an error between a point obtained by reprojecting a three-dimensional model on an image plane of each camera by using camera parameters and a feature point on an image which has served as the basis of calculating the three-dimensional model. In other words, the reprojection error is an error between a reprojected point obtained by reprojecting a three-dimensional point in a three-dimensional model on an image plane of multi-viewpoint image and a two-dimensional point on a multi-viewpoint image corresponding to the three-dimensional point using camera parameters of a camera which has shot the multi-viewpoint image. It should be noted that reliability may be the reliability of the stationary camera and the stationary three-dimensional point. Specifically, a model having a high reliability may be a model in which reprojection error when the stationary three-dimensional point is projected onto the image plane of the stationary camera is small. Alternatively, reliability may be the reliability of all cameras and three-dimensional points including the stationary camera and the stationary three-dimensional point.

Note that reference model selector 410 may select a model which is close in time to a target model, as a reference model, or may select a reference model by combining time and reliability.

Next, coordinate matching scheme selector 411 selects a scheme for matching coordinate systems between the target model and the reference model (S122). Specifically, coordinate matching scheme selector 411 selects one of method 1 of minimizing error in positional parameters of part of camera parameters of stationary cameras and stationary three-dimensional points, and method 2 of minimizing error in positional parameters of all of the stationary cameras and stationary three-dimensional points. For example, coordinate matching scheme selector 411 selects method 1 when the reliability of the relative relation between a camera and a three-dimensional model is high, and selects method 2 when the reliability is low. It should be noted that reliability here may be the reliability of a stationary camera and a stationary three-dimensional point, or may be the reliability of all of the cameras and three-dimensional points including the stationary camera and the stationary three-dimensional point.

Next, coordinate matching processing circuit 412 matches the coordinate systems of a target model and a reference model by using the method selected by coordinate matching scheme selector 411 (S123). Coordinate matching processing circuit 412 minimizes the error between the target model and the reference model by rotating, moving, and scaling the world coordinates of the target model while maintaining the relative relation between the camera and the three-dimensional model.

In this way, three-dimensional reconstruction apparatus 200 reconstructs a plurality of three-dimensional models including a second three-dimensional model, from each of a plurality of multi-viewpoint images obtained by shooting the same real space at different times. Three-dimensional reconstruction apparatus 200 selects a second three-dimensional model as the reference model for the first three-dimensional model from a plurality of three-dimensional models based on the reliability of a plurality of three-dimensional models. For example, three-dimensional reconstruction apparatus 200 selects a three-dimensional model having a highest reliability, or a reliability higher than a reference value. Alternatively, three-dimensional reconstruction apparatus 200 selects a second three-dimensional model as the reference model for the first three-dimensional model from a plurality of three-dimensional models based on the difference between the time of the first three-dimensional model and the time of each of the plurality of three-dimensional models. For example, three-dimensional reconstruction apparatus 200 selects a three-dimensional model in which the difference in time is smallest, or the difference in time is smaller than a reference value. Then, three-dimensional reconstruction apparatus 200 matches the world coordinates of the first three-dimensional model with the world coordinates of the second three-dimensional model.

Since this allows three-dimensional reconstruction apparatus 200 to match the world coordinate of the first three-dimensional model with the word coordinate of the second three-dimensional model which has a high reliability or which is closer in time to the first three-dimensional model, three-dimensional reconstruction apparatus 200 can improve the accuracy of coordinate matching.

Moreover, three-dimensional reconstruction apparatus 200 selects a coordinate matching scheme based on a third reliability that is based on at least one of the first reliability of the first three-dimensional model or the second reliability of the second three-dimensional model, and matches the world coordinate system of the first three-dimensional model and the world coordinate system of the second three-dimensional model by using the selected coordinate matching scheme. For example, the reliability utilizes the reprojection error as an index. It should be noted that the first reliability may be a reliability of first camera parameters of the stationary camera and the stationary three-dimensional points included in the first three-dimensional model. The second reliability may be a reliability of second camera parameters of the stationary camera and the stationary three-dimensional points included in the second three-dimensional model. For example, the first reliability utilizes, as an index, the reprojection error when, using the first camera parameters of the stationary camera included in the first three-dimensional model, the stationary three-dimensional points included in the first three-dimensional model is projected onto the image plane of the stationary camera. The second reliability utilizes, as an index, the reprojection error when, using the second camera parameters of the stationary camera included in the second three-dimensional model, the stationary three-dimensional points included in the second three-dimensional model is projected onto the image plane of the stationary camera.

For example, when the third reliability is higher than the reference value, three-dimensional reconstruction apparatus 200 selects the first coordinate matching scheme (coordinate matching scheme 1) which matches the world coordinate systems of the first three-dimensional model and the second three-dimensional model based on an error between part of the first camera parameters of the stationary cameras and the stationary three-dimensional points included in the first three-dimensional model and part of the second camera parameters of the stationary cameras and the stationary three-dimensional points included in the second three-dimensional model. Moreover, when the third reliability is lower than the reference value, three-dimensional reconstruction apparatus 200 selects the second coordinate matching scheme (coordinate matching scheme 2) which matches the world coordinate systems of the first three-dimensional model and the second three-dimensional model based on an error between all the first camera parameters of the stationary cameras and the stationary three-dimensional points included in the first three-dimensional model and all the second camera parameters of the stationary cameras and the stationary three-dimensional points included in the second three-dimensional model.

Since this allows three-dimensional reconstruction apparatus 200 to use an appropriate coordinate matching scheme according to reliability, three-dimensional reconstruction apparatus 200 can improve the accuracy of coordinate matching.

Figure 15:
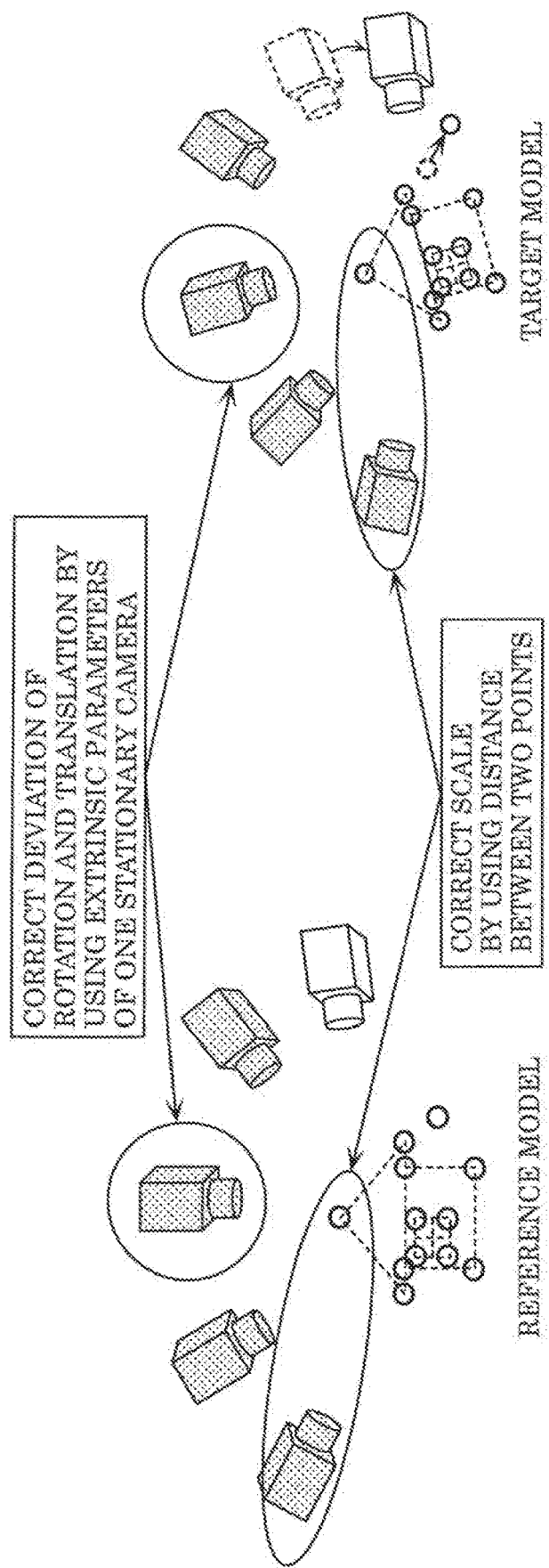
FIG. 15 is a diagram to illustrate coordinate matching scheme 1 according to an embodiment.

Hereinafter, coordinate matching scheme 1 and coordinate matching scheme 2 will be described. First, coordinate matching scheme 1 will be described. FIG. 15 is a diagram to illustrate coordinate matching scheme 1.

Coordinate matching processing circuit 412 selects two points from one or more stationary cameras and one or more stationary three-dimensional points, and calculates a ratio of scale between the world coordinate systems of the target model and the reference model by using the distance between the two points, thereby correcting the target model such that the scale of the target model comes closer to the scale of the reference model. Moreover, coordinate matching processing circuit 412 selects one stationary camera, and calculates deviation of rotation or translation between the world coordinate systems of the target model and the reference model by using extrinsic parameters of the selected stationary camera, thereby correcting the target model such that calculated deviations are minimized. Here, the target model includes one or more stationary cameras, cameras other than the one or more stationary cameras, one or more stationary three-dimensional points, and three-dimensional points other than the one or more stationary three-dimensional points.

Specifically, coordinate matching processing circuit 412 selects two points from a plurality of stationary cameras and a plurality of stationary three-dimensional points included in the target model and the reference model. For example, coordinate matching processing circuit 412 selects points which have high reliability (for example, small reprojection error). Let position information of the selected two points be $P_{T1}=(x_{T1}, y_{T1}, z_{T1})$, $P_{T2}=(x_{T2}, y_{T2}, z_{T2})$ for the target model, and $P_{R1}=(x_{R1}, y_{R1}, z_{R1})$, $P_{R2}=(x_{R2}, y_{R2}, z_{R2})$ for the reference model. The distance between point $P_{T1}$ and point $P_{T2}$ is represented by (Equation 10), and the distance between point $P_{R1}$ and point $P_{R2}$ is represented by (Equation 11).

[Math. 5]

$$D_T=\sqrt{(x_{T1}-x_{T2})^2+(y_{T1}-y_{T2})^2+(z_{T1}-z_{T2})^2} \quad \text{(Equation 10)}$$

$$D_R=\sqrt{(x_{R1}-x_{R2})^2+(y_{R1}-y_{R2})^2+(z_{R1}-z_{R2})^2} \quad \text{(Equation 11)}$$

In this situation, the ratio of scale between the two models is represented by (Equation 12).

$$S=D_R/D_T \quad \text{(Equation 12)}$$

Coordinate matching processing circuit 412 corrects the scale by multiplying position information $P_{TK}$ of all the cameras and three-dimensional points of the target model by this ratio S as shown in (Equation 13).

$$P'_{TR}=SP_{TK} \quad \text{(Equation 13)}$$

Moreover, coordinate matching processing circuit 412 also corrects scale of translation vector $T_{TCn}$ of each camera of the target model as sown in (Equation 14) through a relation T=−RP among rotation matrix, translation vector, and three-dimensional position.

$$T'_{TCn}=ST_{TCn} \quad \text{(Equation 14)}$$

Next, coordinate matching processing circuit 412 selects one corresponding stationary camera in each of the target model and the reference model. Let the stationary camera selected in the target model be target camera TC1, and the stationary camera selected in the reference model be reference camera RC1. Furthermore, let the rotation matrix of the target camera be $R_{TC1}$, the translation vector be $T_{TC1}$, and three-dimensional position be $P'_{TC1}$. Also let the rotation matrix of the reference camera be $R_{RC1}$, the translation vector be $T_{RC1}$, and three-dimensional position be $P_{RC1}$. Coordinate matching processing circuit 412 calculates relative rotation matrix $R_{dif}$ between rotation matrix $R_{TC}$ of the target camera and the rotation matrix $R_{RC}$ of the reference camera by using (Equation 15).

[Math. 6]

$$R_{dif} = R_{RC1}{}^T R_{TC1} \; (R_{RC1}{}^T \text{ represents a transposed matrix of } R_{RC1}) \quad \text{(Equation 15)}$$

Coordinate matching processing circuit 412 corrects the inclination of the coordinate system by multiplying the rotation matrix $R_{TCn}$ of all the camera of the target model by the calculated relative rotation matrix $R_{dif}$ as shown in (Equation 16).

[Math. 7]

$$R'_{dif} = R_{dif} R_{TCn}{}^T \quad \text{(Equation 16)}$$

Next, coordinate matching processing circuit 412 calculates the relative three-dimensional position $P_{dif}$ between the three-dimensional position $P_{TC1}$ of the target camera and the three-dimensional position $P_{RC1}$ of the reference camera by using (Equation 17).

$$P_{dif} = P_{RC1} - P'_{TC1} \quad \text{(Equation 17)}$$

Coordinate matching processing circuit 412 corrects positions by adding calculated relative three-dimensional position $P_{dif}$ to position information $P'_{TK}$ of all the cameras and three-dimensional points of the target model as shown in (Equation 18). Moreover, coordinate matching processing circuit 412 also corrects translation vector $T_{TCn}$ for cameras as shown in (Equation 19).

$$P''_{TK} = P'_{TK} + P_{dif} \quad \text{(Equation 18)}$$

$$T''_{TCn} = R'_{TCn} + P''_{TCn} \quad \text{(Equation 19)}$$

Note that coordinate matching processing circuit 412 does not necessarily need to perform all the coordinate matching of rotation matrix, translation vector, and scale, and may perform any one of them.

In this way, the first three-dimensional model (target model) includes a plurality of three-dimensional points indicating a subject of the first multi-viewpoint image, and a plurality of first camera parameters indicating the positions of a plurality of cameras that shot the first multi-viewpoint image and their orientations (directions in which the cameras face). Similarly, the second three-dimensional model (reference model) includes a plurality of three-dimensional points indicating a subject of the second multi-viewpoint image, and a plurality of second camera parameters indicating positions and orientations of a plurality of cameras that shot the second multi-viewpoint image. Three-dimensional reconstruction apparatus 200 matches, using the stationary cameras and the stationary three-dimensional points, the world coordinates of three-dimensional points of a plurality of subjects and three-dimensional positions and orientations of the plurality of cameras, between the first three-dimensional model and the second three-dimensional model. Note that the three-dimensional position and orientation of a camera may be included in a three-dimensional model, or may be outputted as camera parameters or other form.

Further, when the first coordinate matching scheme is selected, three-dimensional reconstruction apparatus 200 selects two points from the one or more stationary three-dimensional points and three-dimensional positions of the one or more stationary cameras, and corrects deviation of scale between the first three-dimensional model and the second three-dimensional model based on the distance between the selected two points in each of the first three-dimensional model and the second three-dimensional model. Moreover, three-dimensional reconstruction apparatus 200 selects one stationary camera and corrects deviation in rotation or translation between the first three-dimensional model and the second three-dimensional model based on the three-dimensional position and orientation of the selected stationary camera in each of the first three-dimensional model and the second three-dimensional model.

Figure 16:
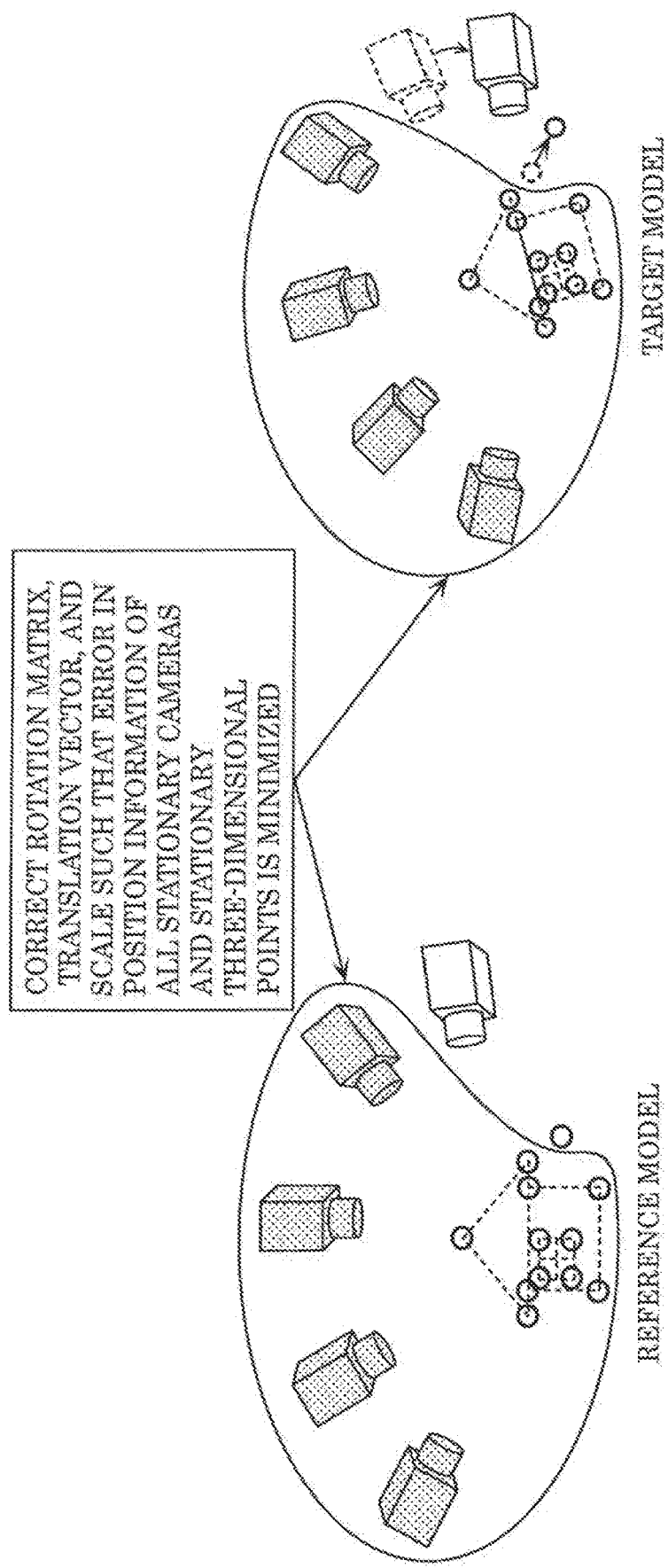
FIG. 16 is a diagram to illustrate coordinate matching scheme 2 according to an embodiment.

Next, coordinate matching method 2 will be described. FIG. 16 is a diagram to illustrate coordinate matching method 2.

In coordinate matching method 2, coordinate matching processing circuit 412 adjusts rotation matrix R, translation vector T, and scale s of the world coordinate system of the target model such that the error in position information of all stationary cameras and stationary three-dimensional points is minimized, while maintaining relative relation within the target model and the reference model. Here, the target model includes one or more stationary cameras, cameras other than the one or more stationary cameras, one or more stationary three-dimensional points, and three-dimensional points other than the one or more stationary three-dimensional points.

Specifically, coordinate matching processing circuit 412 performs minimization of the error through Iterative Closest Point by using (Equation 20). Let position information of a stationary camera and stationary three-dimensional point of the target model be $P_{TK}$, and position information of a stationary camera and stationary three-dimensional point of the reference model be $P_{RK}$.

[Math. 8]

$$err = \sum_{K=n}^{N} \|P_{Rn} - sRP_{Tn} - T\|^2 \quad \text{(Equation 20)}$$

Note that coordinate matching processing circuit 412 may use a part of stationary cameras and stationary three-dimensional points instead of using all stationary cameras and stationary three-dimensional points. In this situation, coordinate matching processing circuit 412 may calculate reliability of each stationary three-dimensional point based on a reprojection error of each stationary three-dimensional point, and use only points having high reliability.

Note that coordinate matching processing circuit 412 does not need to perform all of the coordinate matching of rotation matrix, translation vector, and scale, and may perform any one of them.

In this way, when the second coordinate matching scheme is selected, three-dimensional reconstruction apparatus 200 corrects at least one of rotation, translation, or scale of one of the first three-dimensional model or the second three-dimensional model such that the error on positions of a plurality of stationary three-dimensional points and three-dimensional positions of a plurality of stationary cameras in the first three-dimensional model and the second three-dimensional model is reduced while maintaining relative relation between a plurality of three-dimensional points and three-dimensional positions of a plurality of cameras in the first three-dimensional model, and relative relation between a plurality of three-dimensional points and three-dimensional positions of a plurality of cameras in the second three-dimensional model.

Hereinafter, variations of the embodiment of the present disclosure will be described.

For example, although an example in which one reference model is used has been described in the above description, a plurality of reference models may be used. For example, supposing the time of a target model being t, reference model selector 410 may select two three-dimensional models: that is, three-dimensional models of time t−1 and time t−2, as the reference model. That is, reference model selector 410 may select two three-dimensional models which are prior in time and closest in time to the target model. Alternatively, reference model selector 410 may select two three-dimensional models of time 0 and time t−1 as the reference model. That is, reference model selector 410 may select a three-dimensional model which is first in time, and one three-dimensional model which is prior in time and closest in time to the target model. Alternatively, reference model selector 410 may select two three-dimensional models of time t−1 and time t+1 as the reference model. That is, reference model selector 410 may select one three-dimensional model which is prior in time and closest in time to the target model, and one three-dimensional model which is posterior in time and closest in time to the target model.

Further, reference model selector 410 may select three or more three-dimensional models from three-dimensional models which are prior or posterior in time to the target model, as the reference model.

Further, a target model after coordinate matching may be stored in storage 317, and the target model after coordinate matching may be used as the reference model for coordinate matching thereafter.

Further, coordinate matching circuit 318 does not need to perform coordinate matching when a multi-viewpoint image used in the reconstruction of the target model includes a scene different from that of a multi-viewpoint image at a prior time due to movement of the camera, such as panning and tilting. That is, coordinate matching circuit 318 does not need to perform coordinate matching when it discriminates switching of scene, and the scene has been switched.

Although a three-dimensional reconstruction system according to the embodiments of the present disclosure have been described above, the present disclosure is not limited to such embodiments.

Note that each of the processing circuits included in the three-dimensional reconstruction system according to the embodiments is implemented typically as a large-scale integration (LSI), which is an integrated circuit (C). They may take the form of individual chips, or one or more or all of them may be encapsulated into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

Also, the present disclosure may be embodied as various methods performed by the three-dimensional reconstruction system.

Also, the divisions of the blocks shown in the block diagrams are mere examples, and thus a plurality of blocks may be implemented as a single block, or a single block may be divided into a plurality of blocks, or one or more operations may be performed in another block. Also, the operations of a plurality of blocks performing similar operations may be performed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

Although the three-dimensional reconstruction system according to one or more aspects has been described on the basis of the embodiments, the present disclosure is not limited to such embodiments. The one or more aspects may thus include forms obtained by making various modifications to the above embodiments that can be conceived by those skilled in the art, as well as forms obtained by combining structural components in different embodiments, without materially departing from the spirit of the present disclosure.

INDUSTRIAL APPLICABILITY

The present disclosure can be applied to a three-dimensional reconstruction method and a three-dimensional reconstruction apparatus, and particularly to a three-dimensional space recognition system, a free-viewpoint video generation system, a next-generation monitoring system, and the like.

What is claimed is:

1. A processing method for a three-dimensional model, comprising:
   generating a first three-dimensional model from first images shot by respective cameras at a first time, the first three-dimensional model including: first three-dimensional points indicating a subject at the first time; and first camera parameters indicating positions and orientations of the cameras;
   generating a second three-dimensional model from second images shot by the respective cameras at a second time different from the first time, the second three-dimensional model including: second three-dimensional points indicating the subject at the second time; and second camera parameters indicating positions and orientations of the cameras;
   detecting (1) one or more stationary cameras among the cameras, positions and orientations of the one or more stationary cameras not having changed between the first time and the second time, or (2) one or more stationary three-dimensional points among the plurality of three-dimensional points, positions of the one or more stationary three-dimensional points not having changed between the first time and the second time; and
   matching a first world coordinate system of the first three-dimensional model and a second world coordinate system of the second three-dimensional model, based on the first camera parameters of the one or more stationary cameras or the one or more stationary three-dimensional points detected.

2. The processing method according to claim 1, wherein the first world coordinate system and the second world coordinate system are matched based on both the first camera parameters of the one or more stationary cameras and the one or more stationary three-dimensional points detected.

3. The processing method according to claim 1, wherein in the detecting:
   a global vector for a pair of images consisting of an image included in the first images and an image included in the second images is calculated, the pair of images being shot by a same camera among the cameras; and
   whether the position and the orientation of the camera that shot the pair of images have changed between the first time and the second time is detected using the global vector calculated.

4. The processing method according to claim 1, wherein in the detecting:
   a motion vector of the subject in a pair of images consisting of an image included in the first images and an image included in the second images is calculated, the pair of images being shot by a same camera among the cameras; and
   whether a position of a three-dimensional point corresponding to the subject has changed between the first time and the second time is determined using the motion vector detected.

5. The processing method according to claim 1, wherein in the detecting, whether the position and the orientation of each of the cameras has changed is determined based on a result of sensing by an acceleration sensor included in each of the cameras.

6. The processing method according to claim 1, wherein in the matching:
   two points are selected from the one or more stationary three-dimensional points and three-dimensional positions of the one or more stationary cameras; and
   a deviation in scale between the first three-dimensional model and the second three-dimensional model is corrected based on a distance between the two points selected, in each of the first three-dimensional model and the second three-dimensional model.

7. The processing method according to claim 1, wherein in the matching:
   one stationary camera is selected from the one or more stationary cameras; and
   a deviation in rotation or translation between the first three-dimensional model and the second three-dimensional model is corrected based on a three-dimensional position and an orientation of the one stationary camera selected, in each of the first three-dimensional model and the second three-dimensional model.

8. The processing method according to claim 1, wherein in the matching, at least one of a rotation, a translation, or a scale of the first three-dimensional model or the second three-dimensional model is corrected to maintain relative relationships between the plurality of three-dimensional points and the positions of the cameras in the first three-dimensional model and relative relationships between the plurality of three-dimensional points and the positions of the cameras in the second three-dimensional model, and to reduce error between positions of the one or more stationary three-dimensional points and positions of the one or more stationary cameras in the first three-dimensional model and the second three-dimensional model.

9. The processing method according to claim 1, wherein in the matching, a coordinate matching scheme is selected based on a third reliability which is based on at least one of (i) the first camera parameters of the one or more stationary cameras and a first reliability of the one or more three-dimensional points included in the first three-dimensional model or (ii) the second camera parameters of the one or more stationary cameras and a second reliability of the three-dimensional points included in the second three-dimensional model, and the first world coordinate system of the first three-dimensional model and the second world coordinate system of the second three-dimensional model are matched by using the coordinate matching scheme selected.

10. The processing method according to claim 9, wherein the first reliability utilizes, as an index, a reprojection error obtained when the one or more three-dimensional points included in the first three-dimensional model are projected onto an image plane of the one or more stationary cameras included in the first three-dimensional model, using the first camera parameters of the one or more stationary cameras, and
    the second reliability utilizes, as an index, a reprojection error obtained when the one or more three-dimensional points included in the second three-dimensional model are projected onto an image plane of the one or more stationary cameras included in the second three-dimensional model, using the second camera parameters of the one or more stationary cameras.

11. The processing method according to claim 9, wherein in the matching:
    when the third reliability is higher than a reference value, a first coordinate matching scheme which matches the first world coordinate system of the first three-dimensional model and the second world coordinate system of the second three-dimensional model is selected based on an error between (i) part of the first camera parameters of the one or more stationary cameras and the one or more stationary three-dimensional points included in the first three-dimensional model and (ii) part of the second camera parameters of the one or more stationary cameras and the one or more stationary three-dimensional points included in the second three-dimensional model; and
    when the third reliability is lower than the reference value, a second coordinate matching scheme which matches the first world coordinate system of the first three-dimensional model and the second world coordinate system of the second three-dimensional model is selected based on an error between (i) all of the first camera parameters of the one or more stationary cameras and the one or more stationary three-dimensional points included in the first three-dimensional model and (ii) all of the second camera parameters of the one or more stationary cameras and the one or more stationary three-dimensional points included in the second three-dimensional model.

12. A three-dimensional model processing apparatus, comprising:
    a processor; and
    memory, wherein
    using the memory, the processor:
    generates a first three-dimensional model from first images shot by respective cameras at a first time, the first three-dimensional model including: first three-dimensional points indicating a subject at the first time; and first camera parameters indicating positions and orientations of the cameras;

generates a second three-dimensional model from second images shot by the respective cameras at a second time different from the first time, the second three-dimensional model including: second three-dimensional points indicating the subject at the second time; and second camera parameters indicating positions and orientations of the cameras;

detects (1) one or more stationary cameras among the cameras, positions and orientations of the one or more stationary cameras not having changed between the first time and the second time, or (2) one or more stationary three-dimensional points among the plurality of three-dimensional points, positions of the one or more stationary three-dimensional points not having changed between the first time and the second time; and matches a first world coordinate system of the first three-dimensional model and a second world coordinate system of the second three-dimensional model, based on the first camera parameters of the one or more stationary cameras or the one or more stationary three-dimensional points detected.

* * * * *